(12) United States Patent
Yasuda et al.

(10) Patent No.: US 7,458,482 B2
(45) Date of Patent: Dec. 2, 2008

(54) PROTECTIVE COVER

(75) Inventors: Hitoshi Yasuda, Kawagoe (JP); Satoshi Kojima, Kawagoe (JP)

(73) Assignee: Denyo Kabushiki Kaisha, Tokyo-To (JP)

( * ) Notice: Subject to any disclaimer, the term of this patent is extended or adjusted under 35 U.S.C. 154(b) by 555 days.

(21) Appl. No.: 11/167,268

(22) Filed: Jun. 28, 2005

(65) Prior Publication Data

US 2006/0180586 A1 Aug. 17, 2006

(30) Foreign Application Priority Data

Feb. 10, 2005 (JP) .............................. 2005-033991

(51) Int. Cl.
*B65D 51/18* (2006.01)
*B65D 43/16* (2006.01)
*B65D 43/22* (2006.01)
*B65D 45/16* (2006.01)
*B65D 51/04* (2006.01)

(52) U.S. Cl. ................. 220/826; 220/254.6; 220/255; 220/259.2; 220/326

(58) Field of Classification Search ................. 220/826, 220/254.3, 830, 254.6, 833, 255, 326, 256.1, 220/259.1, 259.2
See application file for complete search history.

(56) References Cited

U.S. PATENT DOCUMENTS

| | | | | | |
|---|---|---|---|---|---|
| 2,014,861 | A | * | 9/1935 | Neely | 220/259.2 |
| 2,351,526 | A | * | 6/1944 | Lebus | 220/203.26 |
| 4,098,427 | A | * | 7/1978 | Duckworth, Jr. | 220/259.2 |
| 4,690,296 | A | * | 9/1987 | Elliott | 251/299 |
| 5,873,481 | A | * | 2/1999 | Gruhn et al. | 220/210 |
| 6,786,353 | B2 | * | 9/2004 | Gourand | 220/835 |

FOREIGN PATENT DOCUMENTS

| | | |
|---|---|---|
| JP | 2-96433 | 8/1990 |
| JP | 3096471 | 7/2003 |

* cited by examiner

*Primary Examiner*—Anthony D Stashick
*Assistant Examiner*—Niki M. Eloshway
(74) *Attorney, Agent, or Firm*—Jacobson Holman PLLC

(57) ABSTRACT

To provide a protective cover capable of enhancing convenience in connecting and disconnecting an external output line and the like without impairing safety. In a protective cover placed on a side wall of a casing and covering a hollow part in which an output part of an apparatus housed in the casing is provided, the cover is characterized by including an outer lid which is supported by a hinge provided at an upper end to be openable and closable, and is provided, at a part close to a lower end, with a first locking member engaging with a catching member that is provided at a lower part of the hollow part, and an internal lid which is rotatably mounted to a position corresponding to the output part in an inner surface of the aforesaid outer lid to cover the output part. The internal lid is supported by a hinge.

5 Claims, 8 Drawing Sheets

PROTECTIVE COVER

CROSS REFERENCE TO RELATED APPLICATIONS

This application is based upon and claims the benefit of priority from the prior Japanese Patent Application No. 2005-33991, filed on Feb. 10, 2005, the entire contents of which are incorporated herein by reference.

BACKGROUND OF THE INVENTION

1. Field of the Invention

The present invention relates to a protective cover provided on a part of a casing that houses an apparatus, and particularly to a protective cover provided at a dangerous region for a person to touch.

2. Related Art

Electrical apparatuses and other apparatuses which are especially planned to be used outdoors are often housed in casings, and each of their output terminals is provided on a part of the casing. A protective cover is provided in front of the output terminal to prevent workers from touching it carelessly.

FIG. 10 is an example of a sound-proof engine driven generator which is shown in Registered Utility Model No. 3096471, and a hollow part 220 is provided in a side wall of a sound-proof case 202 in a sound-proof engine driven generator 201. A mounting plate 210 mounted with output terminals 211 is provided in this hollow part 220, and a front surface of the mounting plate 210 is covered with a lid 227. The lid 227 has a structure in which a hinge not shown is provided at an upper end and a side part is bolted. External output lines 212 are connected to the output terminals 211 by removing bolts, and thereafter, the lid 227 is closed and fixed with the bolts.

FIG. 11 is another example also shown in Registered Utility Model No. 3096471. The output terminal 211 is provided at the mounting plate 210 which is mounted to a left side wall in the drawing of the terminal plate mounting member 220, and the external output line 212 is inserted into the output terminal 211, and is fastened and fixed with a bolt. The external output line 212 is pulled outside from a clearance formed between a lower end of the lid 227 and the terminal mounting member 220.

FIG. 12 is shown in Japanese Utility Model Laid-Open No. 2-96433. A terminal mounting part 303b is provided below an operation panel 312 of a sound-proof engine generator 301 by being partitioned by a front surface cover inside surface 303d and a partition wall 311, and an output terminal 313 is provided on a terminal mounting board 314 placed in this terminal mounting part 303b. A terminal cover 316 is provided to cover the output terminal 313 and the terminal mounting board 314, and this terminal cover 316 is fixed by screwing a bolt (not shown) inserted through a bolt hole 319 into a threaded hole 320, so that the terminal cover 316 is not easily opened.

A protruding piece 316d is provided in the vicinity of a right side hinge shown in the drawing, of the terminal cover 316, so that the protruding piece 316d operates a switch not shown with the terminal cover 316 closed to promote a safe operation.

The structures of the peripheries of the output terminals shown in FIGS. 10-12 have sufficient consideration of safety. However, when the external output lines are frequently connected and disconnected, these structures require complicated operations and are considerably inconvenient in handling.

SUMMARY OF THE INVENTION

The present invention is made in view of the above points, and has its object to provide a protective cover capable of enhancing convenience in connecting and disconnecting external output lines and the like without impairing safety.

In order to achieve the above-described object, the present invention provides, in a protective cover placed on a side wall of a casing and covering a hollow part in which an output part of an apparatus housed in the casing is provided, a protective cover characterized by comprising an outer lid supported by a hinge provided at an upper end of the hollow part to be openable and closable in an up-and-down direction, and is provided, at a part close to a lower end, with a first locking member engaging with a catching member that is provided at a lower part of the hollow part, and an internal lid which is rotatably mounted to a position corresponding to the output part in an inner surface of the outer lid to cover the output part, with its upper end rotatably supported by a hinge, characterized in that the first locking member in the aforesaid outer lid comprises a hook locked at the catching member, a spring biasing the hook to be locked and held at the catching member, and an operation member which releases the biasing by this spring.

Since in the present invention, the protective cover of the double lid structure with the outer lid and the internal lid is adopted as described above, and therefore, the protective cover, in which the outer lid can be easily opened and closed by the operation of an operation lever and when the outer lid is opened, a preliminary protective state by the internal lid is achieved, can be provided.

DETAILED DESCRIPTION OF THE INVENTION

Hereinafter, an embodiment of the present invention will be explained with reference to FIGS. 1 to 9.

Figure 1:
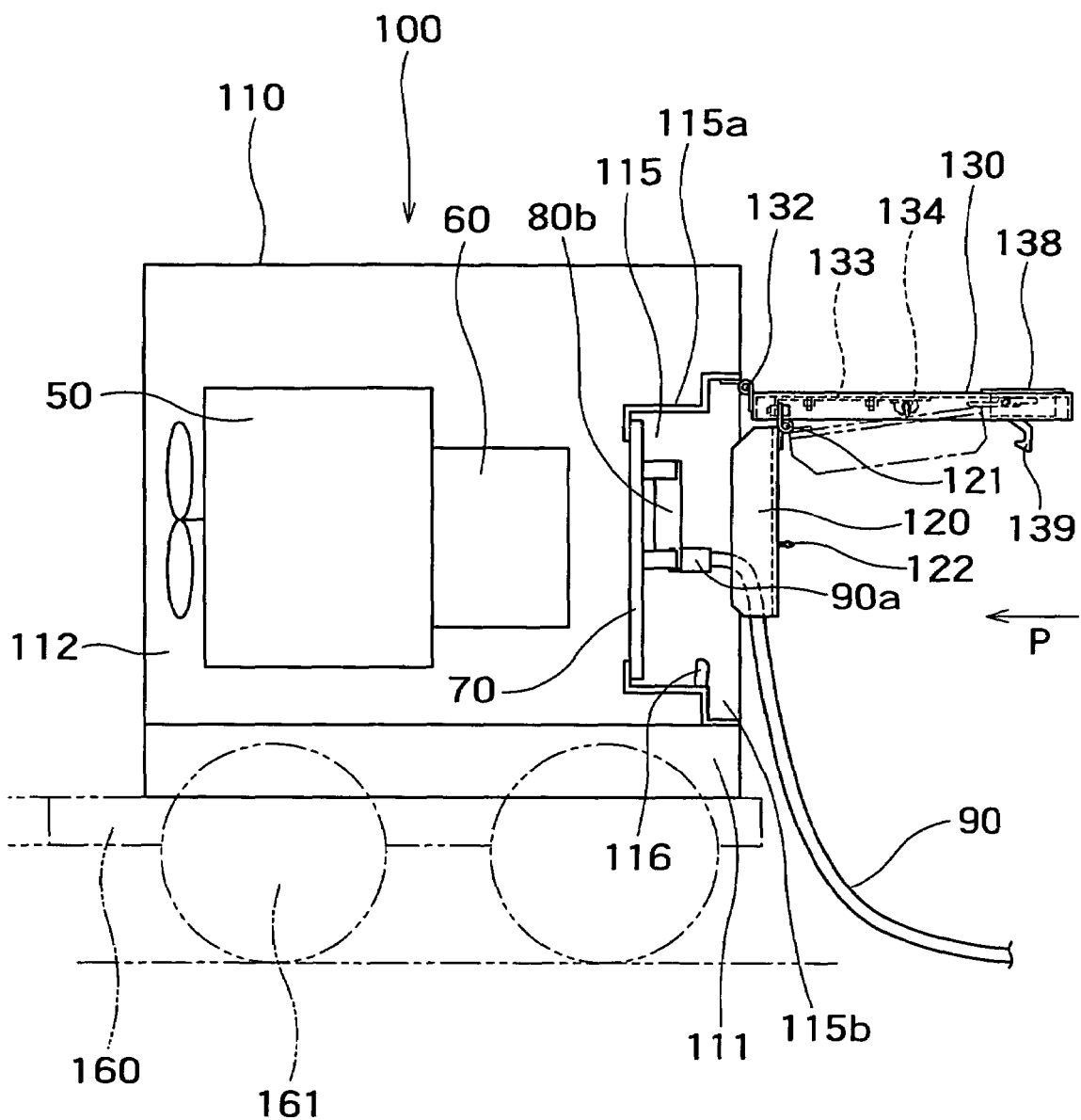
FIG. 1 is a an explanatory view showing a construction of one embodiment of the present invention.

FIG. 1 is a side view of a first embodiment of the present invention. In FIG. 1, an example as a protective cover provided at an output terminal part of a portable engine driven generator 100 is shown.

The engine driven generator 100 has an engine 50 and a generator 60 directly connected, and is housed in a casing 110. The casing 110 is constructed by placing a housing chamber 112 on a base 111, and the output terminal part is provided at a right side in the drawing, of the housing chamber 112. The base 111 is loaded on a carriage 160, and is movable by a wheel 161.

The output terminal part is formed as a box-shaped space inside a mounting frame 115a. An output terminal is placed in this box-shape space, and a front surface is covered with an outer lid 130 of a protective cover.

In the box-shaped space, a blade type terminal plate 80b and a plug-in terminal (not shown) are mounted on an insulating plate 70, and a male terminal 90a provided at a tip end of an output cable 90 is inserted into the plug-in terminal.

At a front surface of the box-shaped space, the outer lid 130 is rotatably supported by a hinge 132 which is provided at an open end and an upper end of the box-shaped space, and is rotated in the counterclockwise direction and is substantially in the horizontal state in the drawing. And, when the outer lid 130 is rotated in the clockwise direction to be in the vertical state, a hook 139 engages with a catching member 116 to bring a housing chamber 115b into a closed state.

At an inner surface of the outer lid 130, an internal lid 120 is supported by a hinge 121 which is mounted to change a relative position with respect to the outer lid 130 with two pairs of bolts. Accordingly, the internal lid 120 can be fixed to be closer to the upper end of the outer lid 130, and can be fixed by being moved to the position closer to the lower end. The internal lid 120 is rotatably supported by the hinge 121, and a catching pin 122, which is provided at a surface opposed to the outer lid 130, engages with a catcher 134, which is provided at a position corresponding to the outer lid 130, to be able to be temporarily caught.

Figure 2:
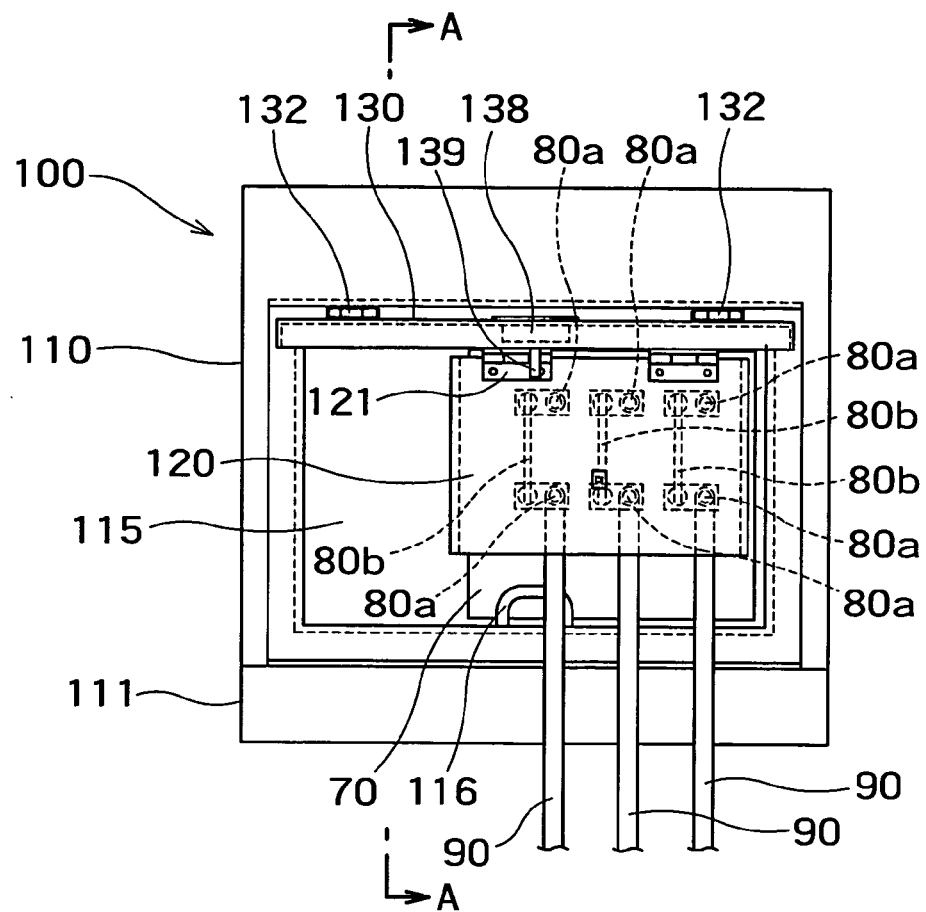
FIG. 2 is a right side view of the embodiment shown in FIG. 1.

FIG. 2 shows an outer surface of the casing 110 in a P-direction in FIG. 1, namely, when the protective cover is seen from its front as a state in which the outer lid 130 is lifted up. Therefore, the internal lid 120 is seen. In this case, the blade type terminal plate 80b is provided a little to the right of the housing chamber 115, and therefore, the internal lid 120 is also mounted to a position which is a little to the right with respect to the protective cover outer lid 130.

It is the output terminals that are shown in the state hidden by the internal lid 120, and each of the phase terminals constructing three phases is provided with two kinds of terminals, which are plug-in terminals 80a and a blade type terminal plate 80b for a clip. The plug-in terminals 80a are usually used, but when connection and disconnection are performed extremely frequently, connection is simply made to the blade type terminal plate 80b by using a clip.

Figure 3:
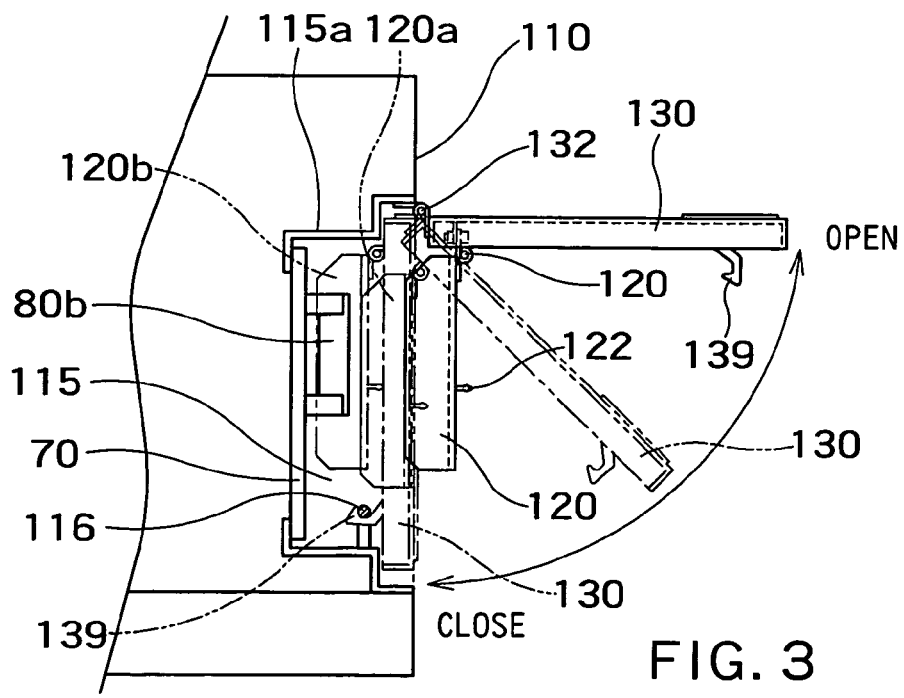
FIG. 3 is an enlarged view of an essential part showing a state in which an outer lid is opened in the embodiment shown in FIG. 1.

FIG. 3 is a sectional view cut along the line A-A in FIG. 2. As shown in FIG. 3, the state in which the outer lid 130 in the horizontal state is rotated around the hinge 132 in the clockwise direction and is in the position at 45 degrees and in the vertical position is shown by the phantom line.

In the vertical state, the hook 139 engages with the catching member 116 provided at the housing chamber 115 to lock the outer lid 130 to bring the housing chamber 115 into the closed state.

Figure 4:
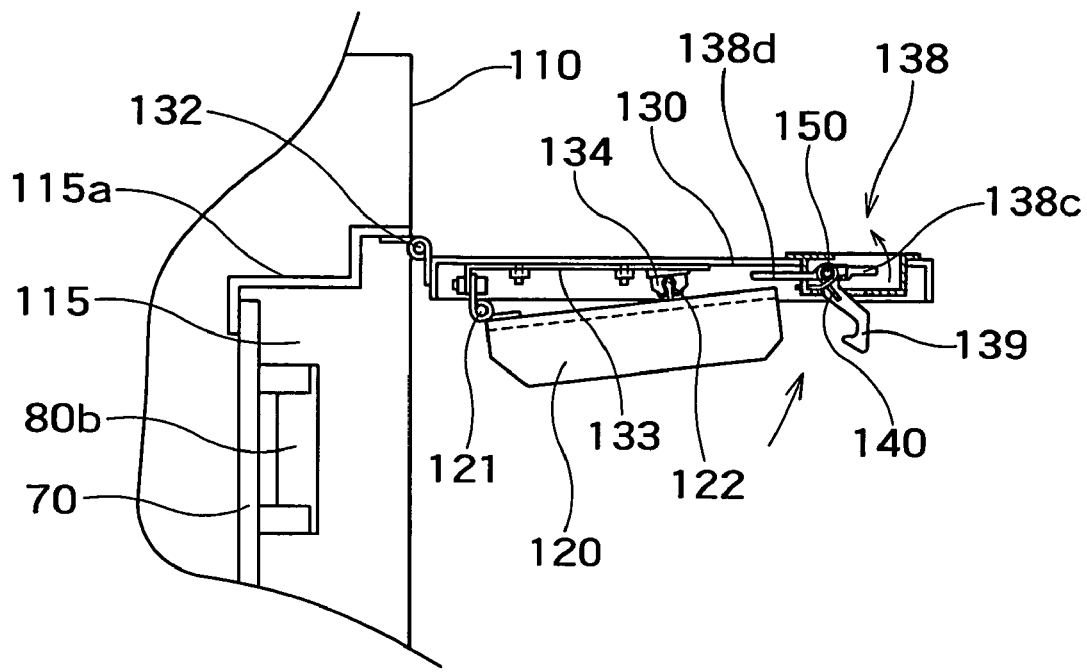
FIG. 4 is an enlarged view of an essential part showing a detailed structure of the outer lid in the embodiment shown in FIG. 1.

FIG. 4 shows a state in which the outer lid 130 of the protective cover is opened again to be in the horizontal position, and especially shows the operation mechanism of the hook 139 here. The hook 139 is biased to rotate in the clockwise direction by a spring 140, and the hook 139 can be rotated in the counterclockwise direction around a pivotal shaft 150 against the biasing force by the spring 140 when the operational force is applied to the hook 139.

A lever 138c is provided to give this operational force, and the operation of rotating the hook 139 in the counterclockwise direction is performed by lifting its tip end upward in the drawing. In order to perform the rotating operation, the outer lid 130 is provided with an opening into which the worker inserts his or her finger.

In the lever 138c, a sleeve 138a as a center of rotation which will be described later is fixedly attached at a substantially central part, and the other end forms a pressing lever 138d. The pressing lever 138d is provided so that the tip end is capable of abutting on a tip end of the internal lid 120, and when the rotating operation of the lever 138c is performed, the pressing lever 138d presses the tip end of the internal lid 120 downward when the internal lid 120 is in the position in FIG. 4. The operation of the lever 138c is performed by being rotated in the counterclockwise direction by a pin 138e, which will be described later and is planted on the lever 138c, and with this, the hook 139 is also rotated in the counterclockwise direction against the biasing force of the spring 140.

Figure 5:
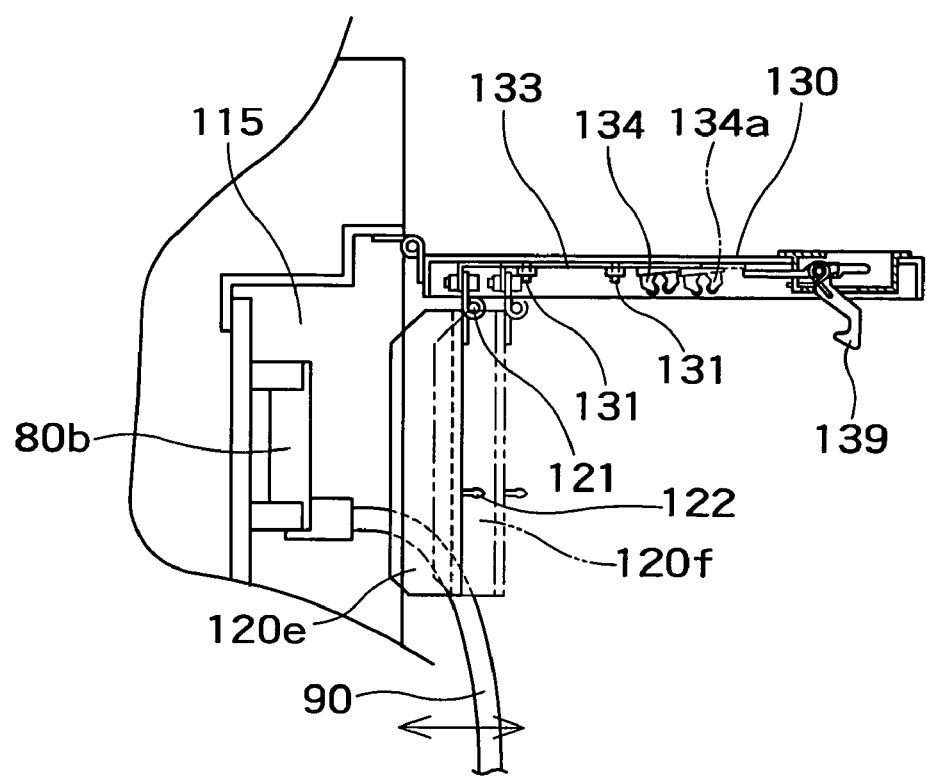
FIG. 5 is an explanatory view showing the relationship of an internal lid 120 and an outer lid 130 in the embodiment shown in FIG. 1.

FIG. 5 is an explanatory view showing the relationship between the internal lid 120 and the outer lid 130. The internal lid 120 is placed at the position where it covers the blade type terminal plate 80b, and it is preferable to prevent contact of the output cable 90 and the inner surface of the internal lid 120. Therefore, it is sometimes necessary to adjust the clearance between the blade type terminal plate 80b and the internal lid 120. Therefore, the internal lid 120 is mounted by using a slide plate 133 of a bolt fastening type capable of being changed in position. Thereby, the internal lid 120 can be fixed at the optimal position by positioning the slide plate 133 and fastening it with the bolt.

As shown in FIG. 5, the internal lid 120 is supported by the hinge 121 and is in the rotatable state with respect to the outer lid 130. Thereby, even when the outer lid 130 is opened, the blade type terminal plate 80b can be still covered, and the danger of the person closeby touching the output terminal plate can be avoided.

Figure 6:
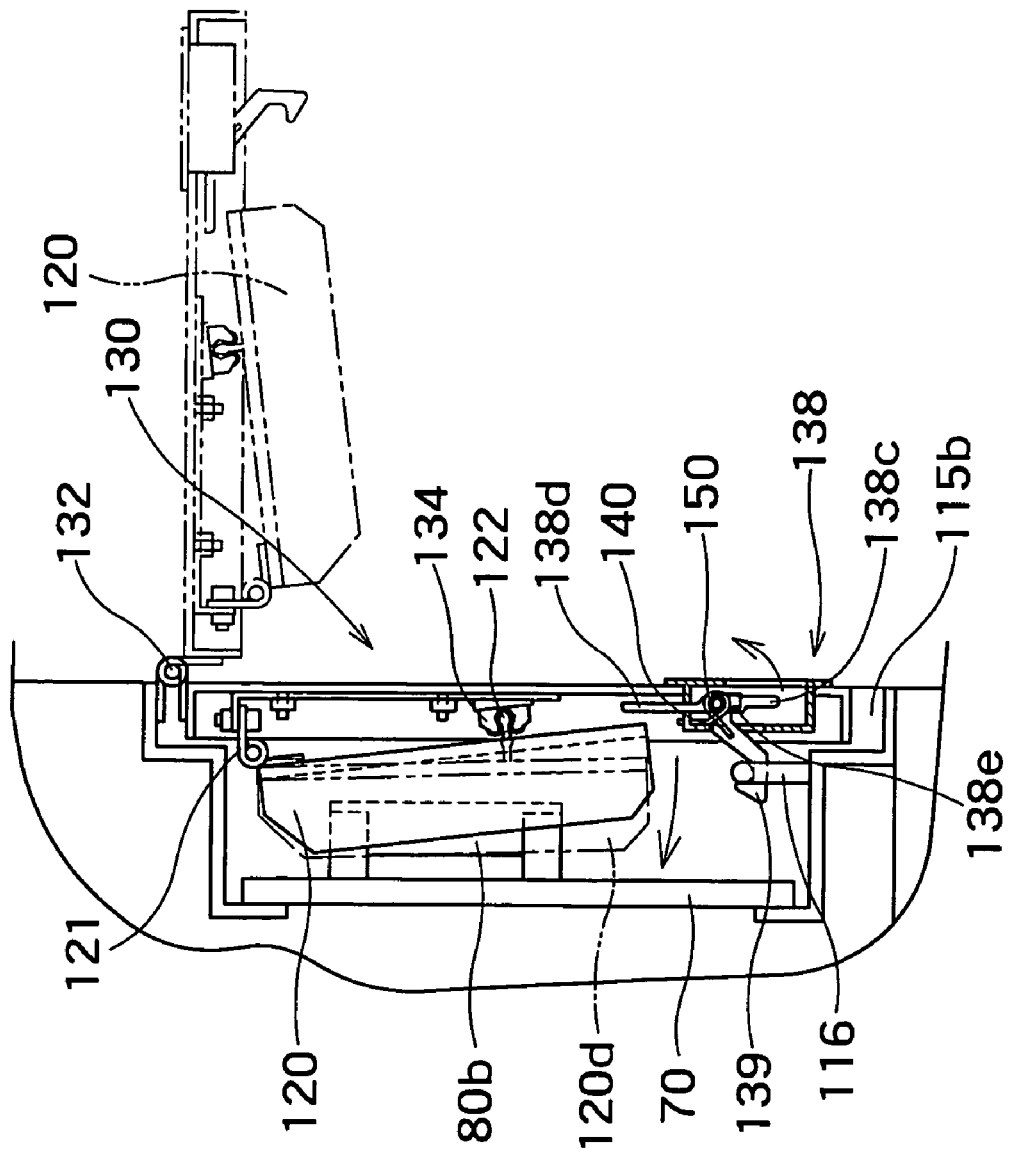
FIG. 6 is an enlarged view of an essential part showing an opening and closing mechanism of the outer lid and the internal lid in the embodiment shown in FIG. 1.

FIG. 6 is a view explaining an outline of the operation mechanism explained in FIG. 4. As shown in FIG. 6, the outer lid 130 shifts to the open state (shown by the phantom line) from the closed state by rotation at substantially 90 degrees between the vertical position and the horizontal position with the hinge 132 as the center, and returns to the closed state from the open state.

In the horizontal position which is the open state, the lower end of the internal lid 120 is shown to be fitted in the catcher 134 of the outer lid 130, but when the outer lid 130 is usually opened by operating the lever 138c, the pressing lever 138d presses the lower end of the internal lid 120 and releases it from the catcher 134 of the outer lid 130, and therefore, the lower end of the internal lid 120 is in the free state.

Figure 7:
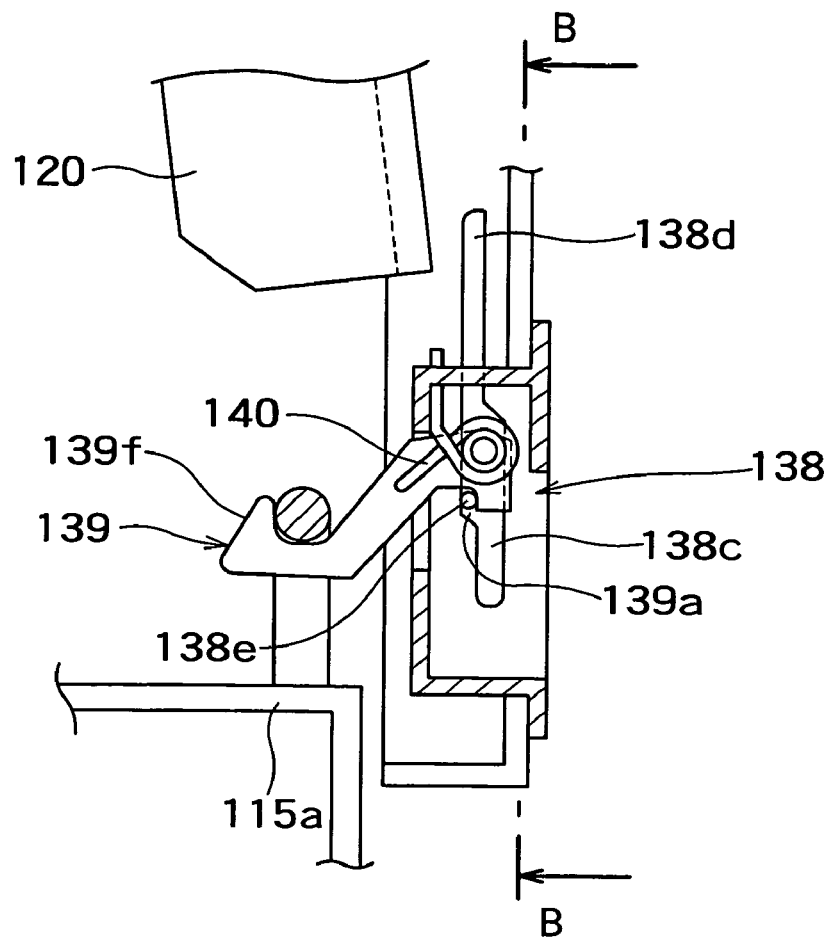
FIG. 7 is an enlarged view of an essential part showing the opening and closing mechanism of the outer lid and the internal lid in the embodiment shown in FIG. 1.
Figure 8:
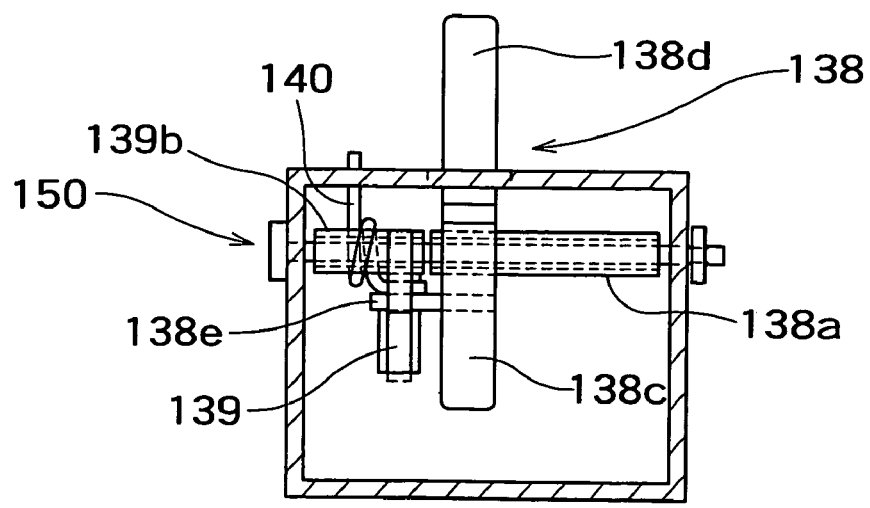
FIG. 8 is an enlarged view of an essential part showing the opening and closing mechanism of the outer lid and the internal lid in the embodiment shown in FIG. 1.

FIGS. 7 and 8 show the operation mechanism shown in FIGS. 4-6 by enlarging it, FIG. 7 is an enlarged partial sectional view, and FIG. 8 is a sectional view taken along the line B-B. This operation mechanism has the operation member 138 and the hook 139 as its main components, and both of them are rotatably and pivotally supported at a shaft 150. Namely, the operation member 138 is fitted to the shaft 150 by the sleeve 138a and the catching member 139 is fitted to the shaft 150 by the sleeve 139b.

When the worker opens the outer lid 130, he or she operates the lever 138c of the operation member 138 to rotate in the counterclockwise direction, and thereby, the pin 138e planted on the operation member 138 presses a projection 139a of the hook 139 to rotate the hook 139 in the counterclockwise direction. As a result, the hook 139 rotates against the rotating biasing force of the biasing spring 140 in the clockwise direction, and is disengaged from the catching member 116, and thereby, the outer lid 130 becomes rotatable.

Figure 9:
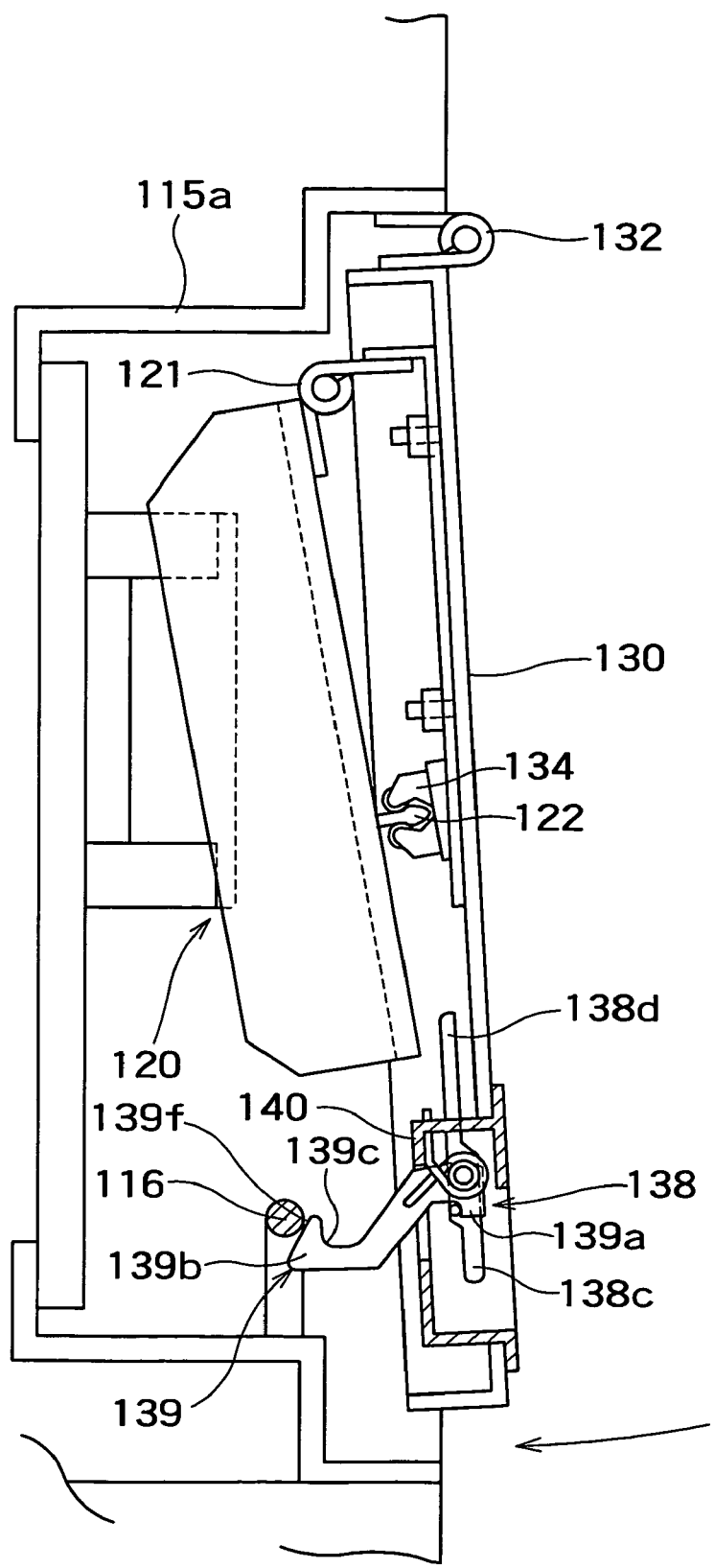
FIG. 9 is an enlarged view of an essential part showing the opening and closing mechanism of the outer lid and the internal lid in the embodiment shown in FIG. 1.
Figure 10:
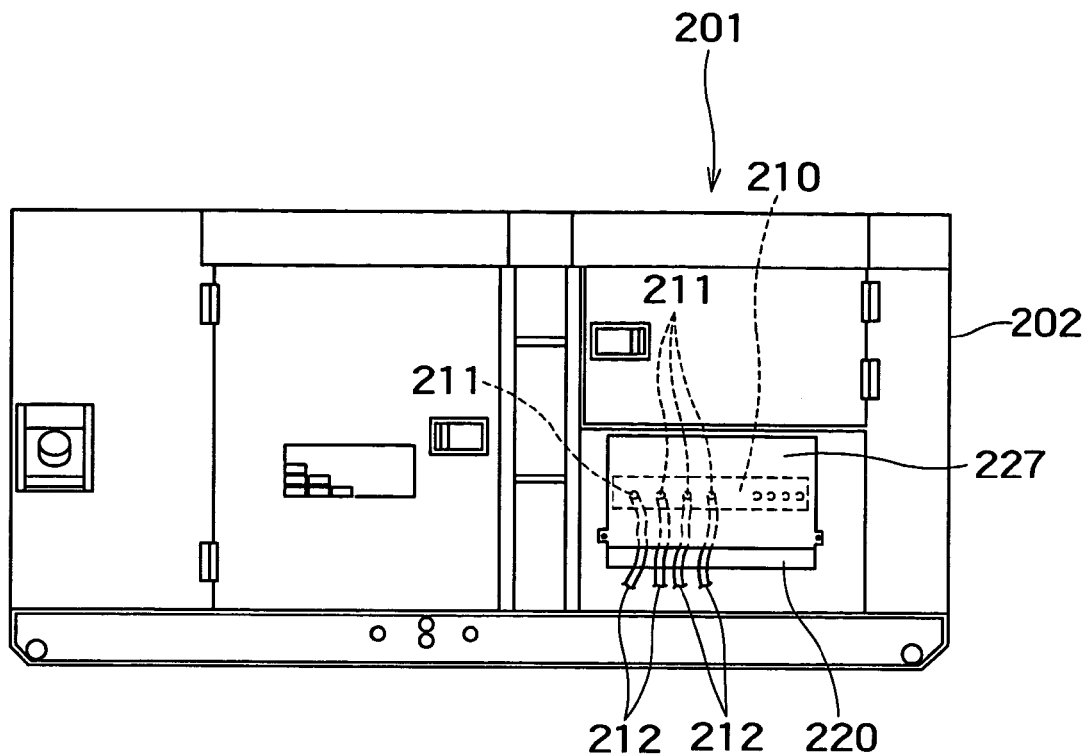
FIG. 10 is an explanatory view showing an output terminal part structure of a conventional engine driven generator.
Figure 11:
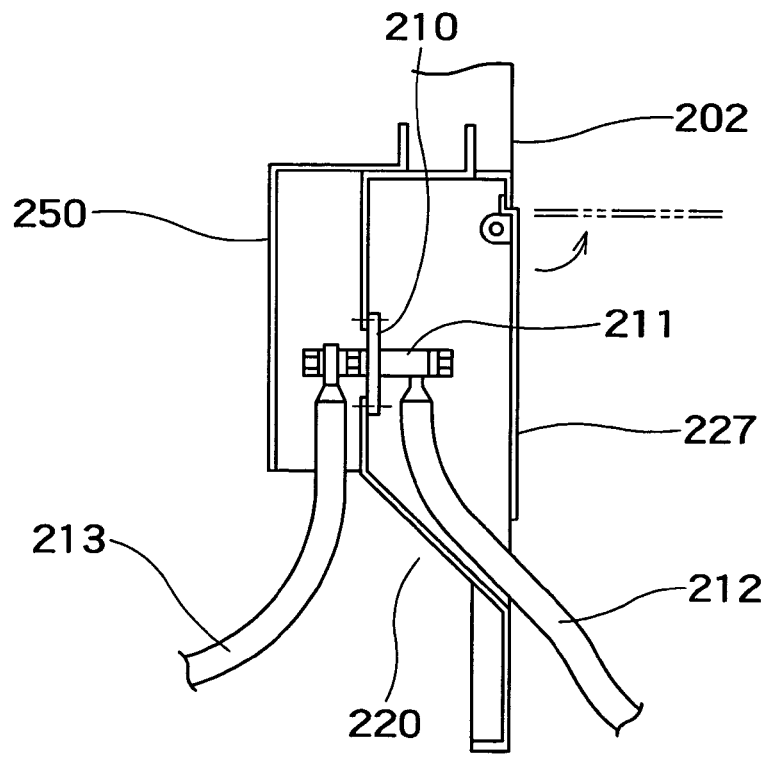
FIG. 11 is an enlarged sectional side view of the output terminal part shown in FIG. 10.
Figure 12:
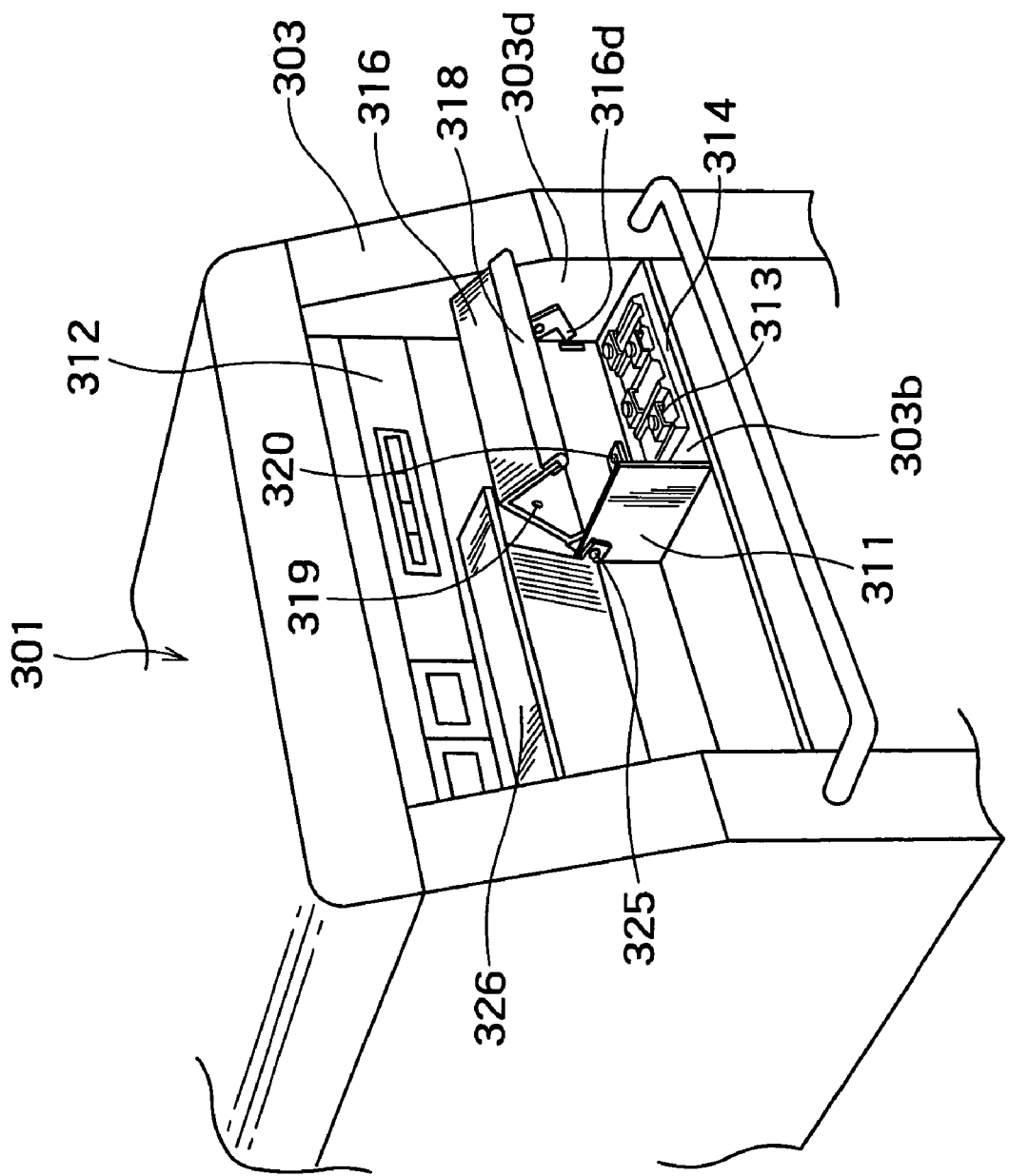
FIG. 12 is an explanatory view showing another conventional output terminal part structure.

FIG. 9 shows the state just before the hook 139 is locked by the catching member 116 while the outer lid 130 is rotated in the clockwise direction with the hinge 132 as the center. The hook 139 has a slide part 139f at an upper side in the drawing at a tip end of the hook 139, and just before the hook 139 is locked by the catching member 116, the slide part 139f abuts on the catching member 116 and slides. When the slide part 139f passes, the catching lever is locked at the catching member 116 by the deeply contoured locking part 139c. Thereby, the outer lid 130 is in the caught state.

What is claimed is:

1. A protective cover placed on a side wall of a casing and covering a hollow part in which an output part of an apparatus housed in the casing is provided, comprising:

an outer lid supported by an hinge provided at an upper end of the hollow part to be openable and closable in an up-and-down direction, and provided, at a part close to a lower end, with a first locking member engaging with a catching member that is provided at a lower part of the hollow part; and an internal lid rotatably mounted to a position corresponding to the output part in an inner surface of said outer lid to cover the output part, with its upper end rotatably supported by a hinge, the first locking member in said outer lid including a hook locked at the catching member, a spring biasing the hook to be locked and held at the catching member, and an operation member which releases the biasing by the spring, said internal lid having a second locking member which is locked at an inner surface of said outer lid at a position close to the lower end, and the first locking member being released with release of locking of the second locking member by an operation of the operation lever.

2. A protective cover placed on a side wall of a casing and covering a hollow part in which an output part of an apparatus housed in the casing is provided, comprising:

an outer lid supported by an hinge provided at an upper end of the hollow part to be openable and closable in an up-and-down direction, and provided, at a part close to a lower end, with a first locking member engaging with a catching member that is provided at a lower part of the hollow part; and an internal lid rotatably mounted to a position corresponding to the output part in an inner surface of said outer lid to cover the output part, with its upper end rotatably supported by a hinge, the first locking member in said outer lid including a hook locked at the catching member, a spring biasing the hook to be locked and held at the catching member, and an operation member which releases the biasing by the spring, said outer lid and said internal lid being provided with a locking mechanism for locking said internal lid at an inner surface of said outer lid.

3. A protective cover placed on a side wall of a casing and covering a hollow part in which an output part of an apparatus housed in the casing is provided, comprising:

an outer lid supported by an hinge provided at an upper end of the hollow part to be openable and closable in an up-and-down direction, and provided, at a part close to a lower end, with a first locking member engaging with a catching member that is provided at a lower part of the hollow part; and an internal lid rotatably mounted to a position corresponding to the output part in an inner surface of said outer lid to cover the output part, with its upper end rotatably supported by a hinge, the first locking member in said outer lid including a hook locked at the catching member, a spring biasing the hook to be locked and held at the catching member, and an operation member which releases the biasing by the spring, said outer lid being provided with a locking member housing part which houses the first locking member and having a window through which the operation lever is operated from outside.

4. A protective cover placed on a side wall of a casing and covering a hollow part in which an output part of an apparatus housed in the casing is provided, comprising:

an outer lid supported by an hinge provided at an upper end of the hollow part to be openable and closable in an up-and-down direction, and provided, at a part close to a lower end, with a first locking member engaging with a catching member that is provided at a lower part of the hollow part; and an internal lid rotatably mounted to a position corresponding to the output part in an inner surface of said outer lid to cover the output part, with its upper end rotatably supported by a hinge, the first locking member in said outer lid including a hook locked at the catching member, a spring biasing the hook to be locked and held at the catching member, and an operation member which releases the biasing by the spring, said internal lid being fixed so that a mounting position with respect to said outer lid is changed.

5. A protective cover placed on a side wall of a casing and covering a hollow part in which an output part of an apparatus housed in the casing is provided, comprising:

an outer lid supported by an hinge provided at an upper end of the hollow part to be openable and closable in an up-and-down direction, and provided, at a part close to a lower end, with a first locking member engaging with a catching member that is provided at a lower part of the hollow part; and an internal lid rotatably mounted to a position corresponding to the output part in an inner surface of said outer lid to cover the output part, with its upper end rotatably supported by a hinge, the first locking member in said outer lid including a hook locked at the catching member, a spring biasing the hook to be locked and held at the catching member, and an operation member which releases the biasing by the spring, said internal lid being folded so that both left and right end portions hold the output part.

* * * * *